US009363051B2

(12) United States Patent
Yamazaki et al.

(10) Patent No.: US 9,363,051 B2
(45) Date of Patent: Jun. 7, 2016

(54) MOBILE COMMUNICATION SYSTEM AND MOBILE COMMUNICATION METHOD

(71) Applicant: KYOCERA CORPORATION, Kyoto (JP)

(72) Inventors: Chiharu Yamazaki, Ota-ku (JP); Kugo Morita, Yokohama (JP); Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/385,826

(22) PCT Filed: Mar. 15, 2013

(86) PCT No.: PCT/JP2013/057359
§ 371 (c)(1),
(2) Date: Sep. 17, 2014

(87) PCT Pub. No.: WO2013/141145
PCT Pub. Date: Sep. 26, 2013

(65) Prior Publication Data
US 2015/0045042 A1    Feb. 12, 2015

Related U.S. Application Data

(60) Provisional application No. 61/612,559, filed on Mar. 19, 2012.

(51) Int. Cl.
*H04L 5/00* (2006.01)
*H04W 16/28* (2009.01)
(Continued)

(52) U.S. Cl.
CPC ............. *H04L 5/0035* (2013.01); *H04W 16/28* (2013.01); *H04W 28/16* (2013.01); *H04W 84/042* (2013.01)

(58) Field of Classification Search
CPC ... H04W 28/16; H04W 16/28; H04W 84/042; H04L 5/0035
See application file for complete search history.

(56) References Cited

U.S. PATENT DOCUMENTS

2010/0238857 A1* 9/2010 Zhang ................. H04L 27/2601
                                                   370/328
2011/0090882 A1* 4/2011 Lee .................... H04L 25/0228
                                                   370/338
(Continued)

FOREIGN PATENT DOCUMENTS

EP    2410669 A1    1/2012
JP    2005-269463 A    9/2005
WO    2011/045658 A1    4/2011

OTHER PUBLICATIONS

International Search Report; PCT/JP2013/057359; Apr. 9, 2013.
(Continued)

*Primary Examiner* — Kenneth Lam
(74) *Attorney, Agent, or Firm* — Studebaker & Brackett PC

(57) ABSTRACT

A non-anchor radio base station (310B) comprises an interface (315B) that notifies the anchor radio base station (310A) of a delay profile between the non-anchor radio base station (310B) and the UE (10). An anchor radio base station (310A) comprises an interface (315A) that notifies a non-anchor radio base station (310B), notifying the delay profile which does not satisfy a predetermined condition, of stoppage of a process of transmitting an uplink signal before decoding through a backhaul network. The non-anchor radio base station (310B) comprises an interface (315B) that stops the process of transmitting the uplink signal before decoding when the non-anchor radio base station (310B) is notified of the stoppage of the process of transmitting the uplink signal before decoding.

4 Claims, 7 Drawing Sheets

(51) Int. Cl.
*H04W 28/16* (2009.01)
*H04W 84/04* (2009.01)

(56) References Cited

U.S. PATENT DOCUMENTS

| | | | |
|---|---|---|---|
| 2011/0243085 A1* | 10/2011 | Seo | H04W 52/40 |
| | | | 370/329 |
| 2012/0002611 A1 | 1/2012 | You et al. | |
| 2012/0115539 A1 | 5/2012 | Zhang et al. | |
| 2012/0195284 A1 | 8/2012 | Mann et al. | |
| 2015/0071197 A1* | 3/2015 | Matsumoto | H04W 16/28 |
| | | | 370/329 |
| 2015/0071199 A1* | 3/2015 | Matsumoto | H04W 72/0413 |
| | | | 370/329 |

OTHER PUBLICATIONS

3GPP TR 36.819 V11.1.0 (Dec. 2011); 3rd Generation Partnership Project; Technical Specification Group Radio Access Network; Coordinated multi-point operation for LTE physical layer aspects (Release 11).

* cited by examiner

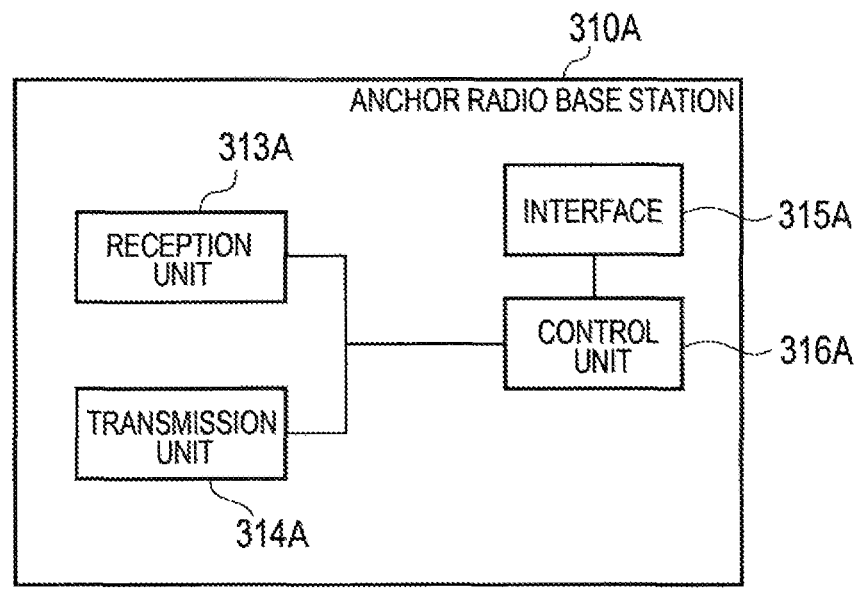
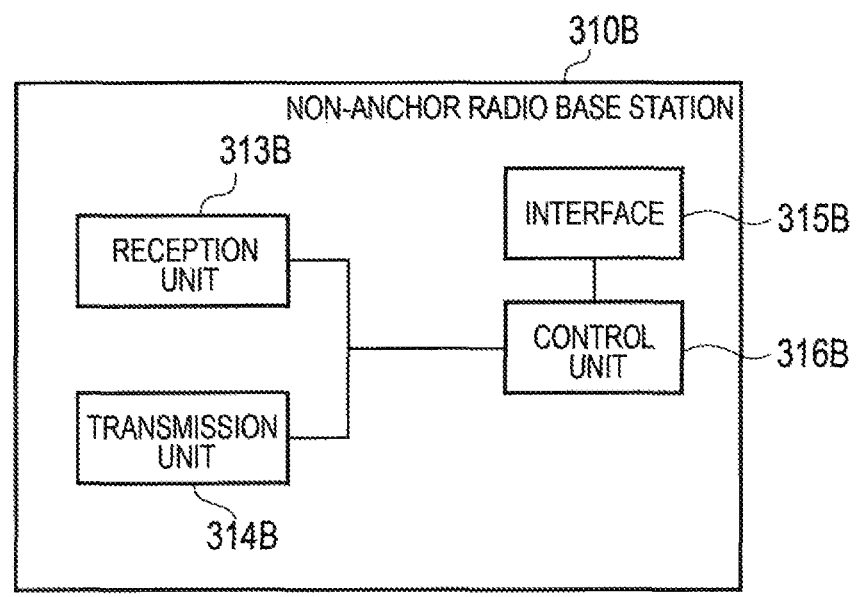

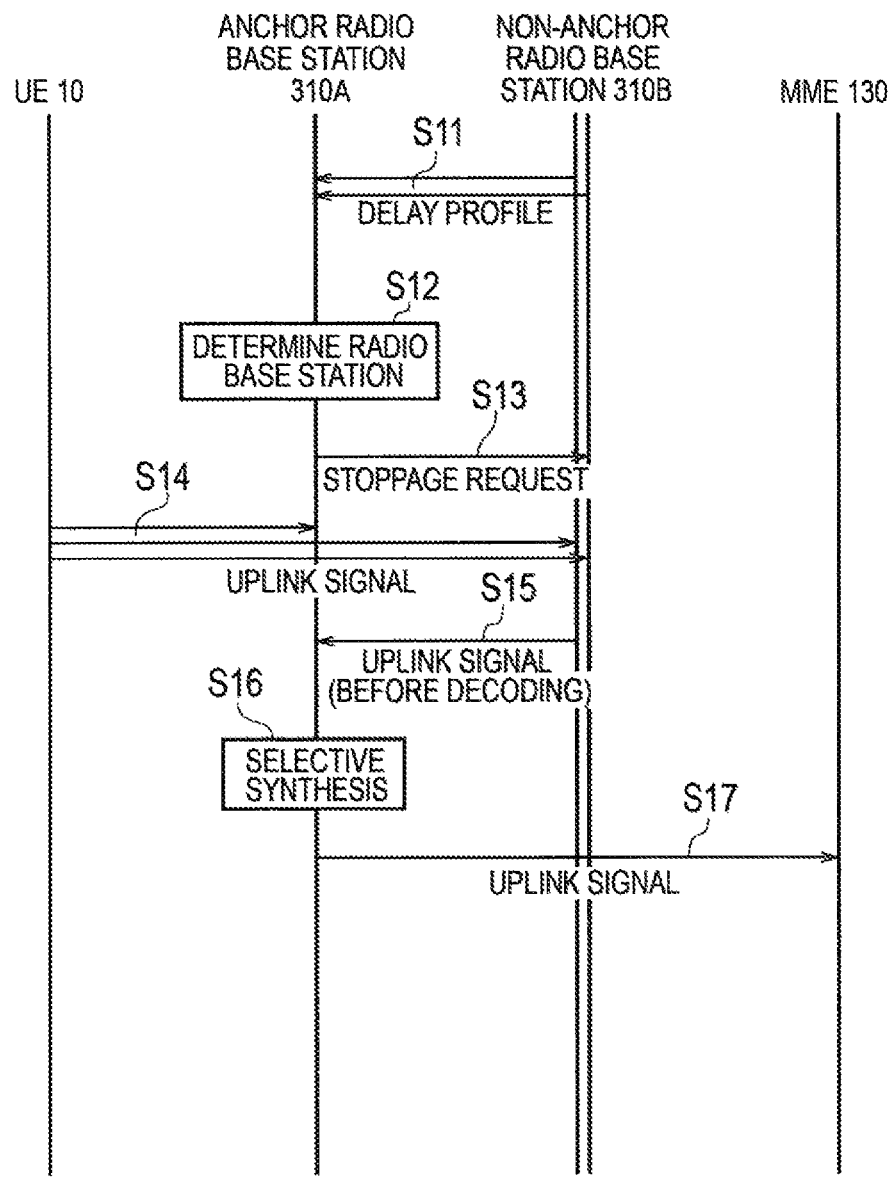

MOBILE COMMUNICATION SYSTEM AND MOBILE COMMUNICATION METHOD

TECHNICAL FIELD

The present invention relates to a mobile communication system in which a plurality of radio base stations receive, in cooperation with one another, uplink signals transmitted from a radio terminal, and a mobile communication method used in the mobile communication system.

BACKGROUND ART

Conventionally, there has been known a mobile communication system in which a plurality of radio base stations receive, in cooperation with one another, uplink signals transmitted from a radio terminal. In such a mobile communication system, selective synthesis of the uplink signals received in the plurality of radio base stations is performed.

For example, in LTE (Long Term Evolution), the uplink signal is transmitted through PUSCH (Physical Uplink Shared Channel).

Here, the plurality of radio base stations include one anchor radio base station and remaining non-anchor radio base stations. The non-anchor radio base stations transmit uplink signals before decoding to the anchor radio base station through a backhaul network. The anchor radio base station performs selective synthesis of uplink signals before decoding, which are transmitted from the radio terminal, and uplink signals before decoding, which are received from the non-anchor radio base stations.

However, in such a case, since the uplink signals before decoding are transmitted from the non-anchor radio base stations to the anchor radio base station through the backhaul network, a load of the backhaul network is increased.

PRIOR ART DOCUMENT

Non-Patent Document

[Non-patent Document 1] 3GPP technology specifications TR 36.819 V11.1.0 (Dec. 22, 2011)

SUMMARY OF INVENTION

A mobile communication system according to a first feature is a system, in which a plurality of radio base stations receive, in cooperation with one another, uplink signals transmitted from a radio terminal. The plurality of radio base stations comprise one anchor radio base station and a non-anchor radio base station other than the anchor radio base station. The non-anchor radio base station comprises a non-anchor-side notification unit that notifies the anchor radio base station of a delay profile between the non-anchor radio base station and the radio terminal. The anchor radio base station comprises an anchor-side notification unit that notifies a non-anchor radio base station, notifying the delay profile which does not satisfy a predetermined condition, of stoppage of a process of transmitting an uplink signal before decoding through a backhaul network and a control unit that performs selective synthesis of the uplink signal before decoding, which is received from the non-anchor radio base station, and an uplink signal before decoding, which is received from the radio terminal. The non-anchor radio base station comprises a transmission unit that stops the process of transmitting the uplink signal before decoding when the non-anchor radio base station is notified of the stoppage of the process of transmitting the uplink signal before decoding, and continues the process of transmitting the uplink signal before decoding when the non-anchor radio base station is not notified of the stoppage of the process of transmitting the uplink signal before decoding.

A mobile communication system according to a second feature is a system, in which a plurality of radio base stations receive, in cooperation with one another, uplink signals transmitted from a radio terminal. The plurality of radio base stations comprise one anchor radio base station and a non-anchor radio base station other than the anchor radio base station. The anchor radio base station comprises an anchor-side notification unit that notifies the non-anchor radio base station of a delay profile between the anchor radio base station and the radio terminal and a control unit that performs selective synthesis of an uplink signal before decoding, which is received from the non-anchor radio base station through a backhaul network, and an uplink signal before decoding, which is received from the radio terminal. The non-anchor radio base station comprises a transmission unit that stops a process of transmitting the uplink signal before decoding when the delay profile notified by the anchor radio base station does not satisfy a predetermined condition, and continues the process of transmitting the uplink signal before decoding when the delay profile notified by the anchor radio base station satisfies the predetermined condition.

A mobile communication method according to a third feature is a method, in which a plurality of radio base stations receive, in cooperation with one another, uplink signals transmitted from a radio terminal. The plurality of radio base stations comprise one anchor radio base station and a non-anchor radio base station other than the anchor radio base station. The mobile communication method comprises the steps of notifying, by the non-anchor radio base station, the anchor radio base station of a delay profile between the non-anchor radio base station and the radio terminal notifying, by the anchor radio base station, a non-anchor radio base station that notifies the delay profile which does not satisfy a predetermined condition, of stoppage of a process of transmitting an uplink signal before decoding through a backhaul network stopping, by a non-anchor radio base station notified of the stoppage of the process of transmitting the uplink signal before decoding, the process of transmitting the uplink signal before decoding continuing, by a non-anchor radio base station not notified of the stoppage of the process of transmitting the uplink signal before decoding, the process of transmitting the uplink signal before decoding and performing, by the anchor radio base station, selective synthesis of the uplink signal before decoding, which is received from the non-anchor radio base station, and an uplink signal before decoding, which is received from the radio terminal.

A mobile communication method according to a fourth feature is a method, in which a plurality of radio base stations receive, in cooperation with one another, uplink signals transmitted from a radio terminal. The plurality of radio base stations comprise one anchor radio base station and a non-anchor radio base station other than the anchor radio base station. The mobile communication method comprises the steps of notifying, by the anchor radio base station, the non-anchor radio base station of a delay profile between the anchor radio base station and the radio terminal stopping, by the non-anchor radio base station, a process of transmitting an uplink signal before decoding through a backhaul network when the delay profile notified by the anchor radio base station dose not satisfy a predetermined condition continuing, by the non-anchor radio base station, the process of transmitting the uplink signal before decoding when the delay profile notified by the anchor radio base station satisfies the predetermined condition and performing, by the anchor radio base station, selective synthesis of the uplink signal before decoding, which is received from the non-anchor radio base station, and an uplink signal before decoding, which is received from the radio terminal.

BRIEF DESCRIPTION OF DRAWINGS

FIG. 5 is a block diagram illustrating the anchor radio base station 310A according to the first embodiment.

FIG. 6 is a block diagram illustrating the non-anchor radio base station 310B according to the first embodiment.

FIG. 7 is a sequence diagram illustrating the operation of the mobile communication system 100 according to the first embodiment.

DESCRIPTION OF EMBODIMENTS

Figure 1:
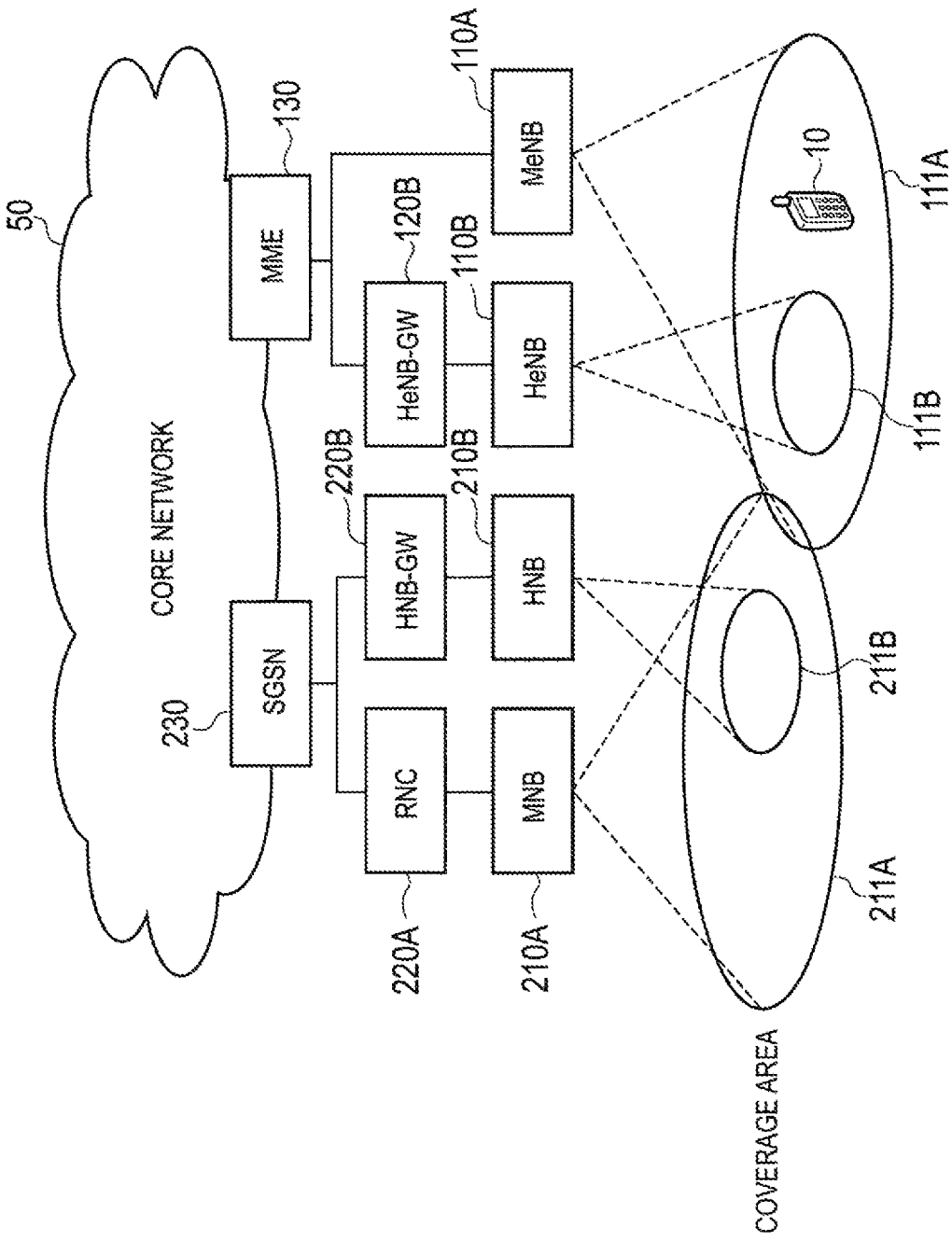
FIG. 1 is a diagram illustrating a mobile communication system 100 according to the first embodiment.

Hereinafter, a description will be given of the mobile communication system according to the embodiments of the present invention, with reference to the drawings. Note that the same or similar reference signs are applied to the same or similar portions in the drawings.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

SUMMARY OF THE EMBODIMENT

First, the mobile communication system according to the embodiment is a system, in which a plurality of radio base stations receive, in cooperation with one another, uplink signals transmitted from a radio terminal. The plurality of radio base stations comprise: one anchor radio base station; and a non-anchor radio base station other than the anchor radio base station.

The non-anchor radio base station comprises: a non-anchor-side notification unit that notifies the anchor radio base station of a delay profile between the non-anchor radio base station and the radio terminal. The anchor radio base station comprises an anchor-side notification unit that notifies a non-anchor radio base station, notifying the delay profile which does not satisfy a predetermined condition, of stoppage of a process of transmitting an uplink signal before decoding through a backhaul network; and a control unit that performs selective synthesis of the uplink signal before decoding, which is received from the non-anchor radio base station, and an uplink signal before decoding, which is received from the radio terminal. The non-anchor radio base station comprises: a transmission unit that stops the process of transmitting the uplink signal before decoding when the non-anchor radio base station is notified of the stoppage of the process of transmitting the uplink signal before decoding, and continues the process of transmitting the uplink signal before decoding when the non-anchor radio base station is not notified of the stoppage of the process of transmitting the uplink signal before decoding.

In the embodiment, the anchor radio base station notifies a non-anchor radio base station, notifying the delay profile which does not satisfy a predetermined condition, of stoppage of a process of transmitting an uplink signal before decoding through a backhaul network. Consequently, unnecessary transmission of uplink signals before decoding to the anchor radio base station from a non-anchor radio base station, for which synchronization has not been sufficiently made, is suppressed, resulting in the suppression of an increase in the load of the backhaul network.

Second, the mobile communication system according to the embodiment is a system, in which a plurality of radio base stations receive, in cooperation with one another, uplink signals transmitted from a radio terminal. The plurality of radio base stations comprise: one anchor radio base station; and a non-anchor radio base station other than the anchor radio base station. The anchor radio base station comprises: an anchor-side notification unit that notifies the non-anchor radio base station of a delay profile between the anchor radio base station and the radio terminal; and a control unit that performs selective synthesis of an uplink signal before decoding, which is received from the non-anchor radio base station through a backhaul network, and an uplink signal before decoding, which is received from the radio terminal. The non-anchor radio base station comprises: a transmission unit that stops a process of transmitting the uplink signal before decoding when the delay profile notified by the anchor radio base station does not satisfy a predetermined condition, and continues the process of transmitting the uplink signal before decoding when the delay profile notified by the anchor radio base station satisfies the predetermined condition.

In the embodiment, the non-anchor radio base station stops a process of transmitting the uplink signal before decoding when the delay profile notified by the anchor radio base station does not satisfy a predetermined condition. Consequently, unnecessary transmission of uplink signals before decoding to the anchor radio base station from a non-anchor radio base station, for which synchronization has not been sufficiently made, is suppressed, resulting in the suppression of an increase in the load of the backhaul network.

First Embodiment

Mobile Communication System

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system, includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up of a radio connection with the MeNB 110A. Furthermore, the MME 130, which is connected to the HeNB 110B via the HeNB-GW 120B, is a device that manages the mobility of the UE 10 having set up of a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDCCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal that notifies a recommended modulation scheme and an encoding rate to be used in downlink transmission. The PMI is a signal that indicates a precoder matrix preferably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether it is possible to receive a signal that is transmitted through a downlink channel (for example, PDSCH).

The uplink shared channel is a channel that carries a control signal (including the aforementioned control signal) and/or a data signal. For example, the uplink radio resource may be assigned only to the data signal, or may be assigned such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal that indicates the assignment of the uplink radio resource. The Downlink SI is a signal that indicates the assignment of a downlink radio resource. The TPC bit is a signal that indicates increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal that is transmitted through a channel other than the downlink control channel (PDCCH)

and the downlink shared channel (PDSCH) includes the ACK/NACK. The ACK/NACK is a signal that indicates whether it is possible to receive a signal that is transmitted through an uplink channel (for example, PUSCH).

In addition, the general cell and the specific cell broadcast broadcast information through a broadcast channel (BCCH; Broadcast Control Channel). The broadcast information, for example, is information such as MIB (Master Information Block) or SIB (System Information Block).

(Radio Frame)

Figure 2:
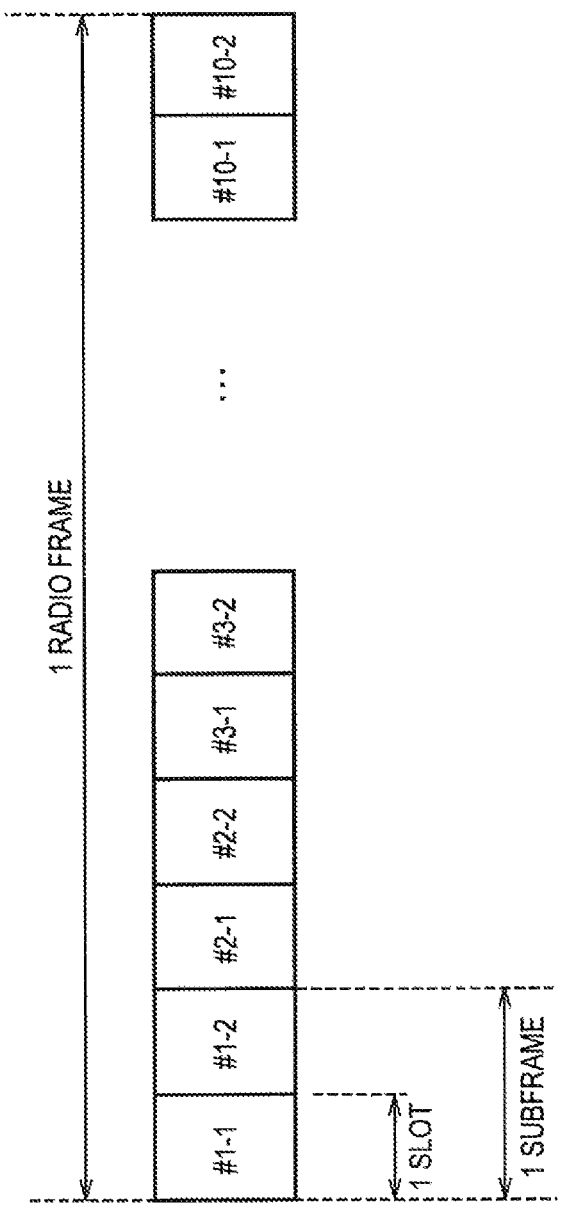
FIG. 2 is a diagram illustrating the radio frame in the first communication system.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
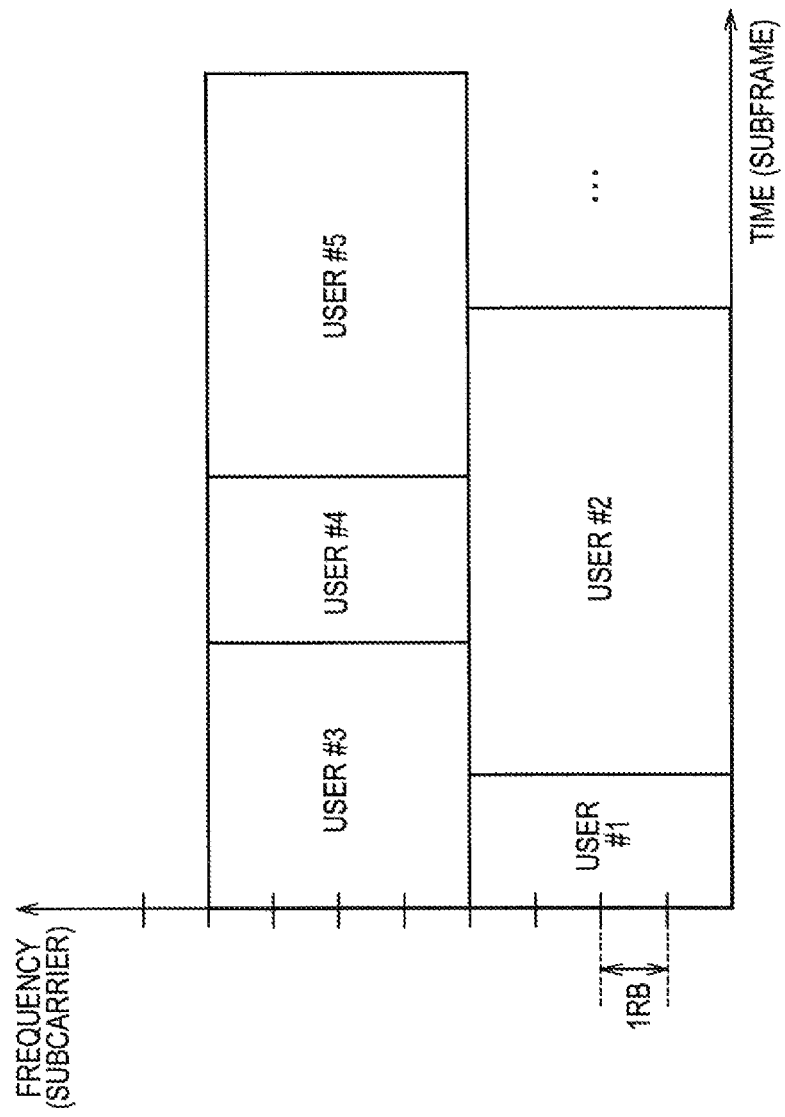
FIG. 3 is a diagram illustrating the radio resource in the first communication system.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The radio resource is assigned to each UE 10 on the basis of the CQI, the PMI, the RI and the like.

(Application Scene)

Figure 4:
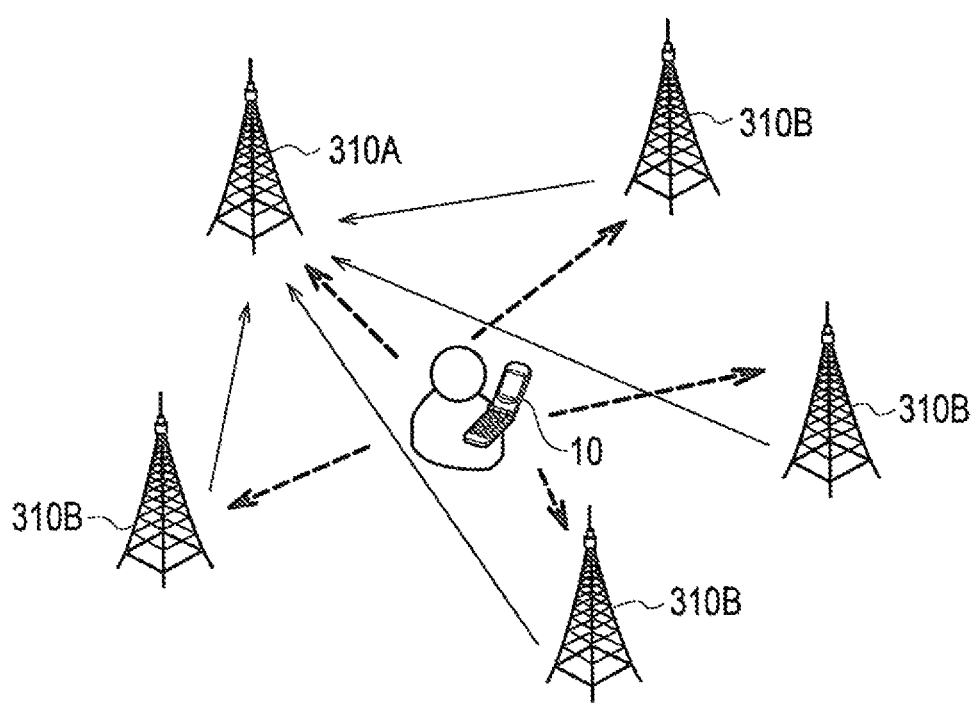
FIG. 4 is a diagram for explaining the application scene according to the first embodiment.

Hereinafter, an application scene according to the first embodiment will be described. FIG. 4 is a diagram for explaining the application scene according to the first embodiment. FIG. 4 illustrates a case in which one anchor radio base station 310A and a plurality of non-anchor radio base stations 310B are provided as radio base stations. The anchor radio base station 310A and the non-anchor radio base stations 310B constitute a radio base station group (a CoMP set) that receives uplink signals transmitted from the UE 10 in cooperation with each other.

As illustrated in FIG. 4, the UE 10 transmits the uplink signals to the anchor radio base station 310A and the non-anchor radio base stations 310B. It is noted that the uplink signals transmitted from the UE 10 are coded. For example, the uplink signals transmitted from the UE 10, for example, are transmitted through the aforementioned uplink shared channel (PUSCH).

Here, the non-anchor radio base stations 310B transmit uplink signals before decoding to the anchor radio base station 310A through a backhaul network. The anchor radio base station 310A performs selective synthesis of uplink signals before decoding, which are transmitted from the UE 10, and uplink signals before decoding, which are received from the non-anchor radio base stations 310B.

The backhaul network may be an X2 interface for directly connecting radio base stations to each other, or an S1 interface for connecting the radio base stations to each other through an upper node (for example, the MME 130).

It is sufficient if the anchor radio base station 310A and the non-anchor radio base stations 310B are radio base stations. That is, in the first embodiment, the anchor radio base station 310A and the non-anchor radio base stations 310B are one of the MeNB 110A, the HeNB 110B, the MNB 210A, and the HNB 210B.

In such a case, in the first embodiment, the non-anchor radio base stations 310B notify the anchor radio base station 310A of delay profiles between the non-anchor radio base stations 310B and the UE 10. The anchor radio base station 310A notifies a non-anchor radio base station 310B, notifying the delay profiles which do not satisfy a predetermined condition, of stoppage of a process of transmitting uplink signals before decoding through the backhaul network. When the non-anchor radio base station 310B is notified of the stoppage of the process of transmitting the uplink signal before decoding, the non-anchor radio base station 310B stops the process of transmitting the uplink signal before decoding. Meanwhile, when the non-anchor radio base station 310B is not notified of the stoppage of the process of transmitting the uplink signal before decoding, the non-anchor radio base station 310B continues the process of transmitting the uplink signal before decoding.

Here, the delay profile, for example, is transmission timing correction information (TA; Timing Advance) of the uplink signal transmitted from the UE 10 to the radio base station. The TA is measured by the radio base station based on the uplink signals transmitted from the UE 10.

The predetermined condition indicates that an amount (hereinafter, referred to as a shift amount), by which a delay profile (TA) between the UE 10 and the non-anchor radio base station 310B is shifted from a delay profile (TA) between the UE 10 and the anchor radio base station 310A, is within an allowable range. In other words, the predetermined condition indicates that a synchronization difference of the uplink signals is within the allowable range between the anchor radio base station 310A and the non-anchor radio base station 310B.

(Anchor Radio Base Station)

Hereinafter, an anchor radio base station according to the first embodiment will be described. FIG. 5 is a block diagram illustrating the anchor radio base station 310A according to the first embodiment.

As illustrated in FIG. 5, the anchor radio base station 310A includes a reception unit 313A, a transmission unit 314A, an interface 315A, and a control unit 316A.

The reception unit 313A receives an uplink signal from the UE 10 connected to a cell managed by the anchor radio base station 310A. The reception unit 313A, for example, receives the uplink signal through the uplink shared channel (PUSCH).

The transmission unit 314A transmits a downlink signal to the UE 10 connected to the cell managed by the anchor radio base station 310A. The transmission unit 314A, for example, transmits a radio resource (scheduling information) assigned by the anchor radio base station 310A.

The interface 315A is an interface used for performing communication with another radio base station through the backhaul network. The interface 315A is an X2 interface for directly connecting radio base stations to each other. Alternatively, the interface 315A is an S1 interface for connecting the radio base stations to each other through an upper node (for example, the MME 130).

In the first embodiment, the interface 315A constitutes an anchor-side notification unit that notifies the non-anchor radio base station 310B, notifying the delay profiles which do not satisfy the predetermined condition, of the stoppage of the process of transmitting the uplink signals before decoding through the backhaul network.

The control unit 316A is configured to control the operation of the anchor radio base station 310A. The control unit 316A, for example, performs selective synthesis of uplink signals before decoding, which are transmitted from the UE 10, and uplink signals before decoding, which are received from the non-anchor radio base stations 310B. Specifically, the control unit 316A may select an uplink signal before decoding, which has the best received quality among the uplink signals before decoding, which are transmitted from the UE 10 and the uplink signals before decoding, which are received from the non-anchor radio base stations 310B, and may decode the selected uplink signal before decoding. Alternatively, the control unit 316A may synthesize uplink signals before decoding, which have predetermined quality or more among the uplink signals before decoding, which are transmitted from the UE 10 and the uplink signals before decoding, which are received from the non-anchor radio base stations 310B, and may decode the synthesized uplink signal before decoding. In addition, the control unit 316A may synthesize all of the uplink signals before decoding, which are transmitted from the UE 10 and the uplink signals before decoding, which are received from the non-anchor radio base stations 310B, and may decode the synthesized uplink signal before decoding.

(Non-Anchor Radio Base Station)

Hereinafter, a non-anchor radio base station according to the first embodiment will be described. FIG. 6 is a block diagram illustrating the non-anchor radio base station 310B according to the first embodiment.

As illustrated in FIG. 6, the non-anchor radio base station 310B includes a reception unit 313B, a transmission unit 314B, an interface 315B, and a control unit 316B.

The reception unit 313B receives an uplink signal from the UE 10 connected to a cell managed by the non-anchor radio base station 310B. The reception unit 313B, for example, receives the uplink signal through the uplink shared channel (PUSCH).

The transmission unit 314B transmits a downlink signal to the UE 10 connected to the cell managed by the non-anchor radio base station 310B. The transmission unit 314B, for example, transmits a radio resource (scheduling information) assigned by the non-anchor radio base station 310B.

The interface 315B is an interface used for performing communication with another radio base station through the backhaul network. The interface 315B is an X2 interface for directly connecting radio base stations to each other. Alternatively, the interface 315B is an S1 interface for connecting the radio base stations to each other through an upper node (for example, the MME 130).

In the first embodiment, the interface 315B constitutes a non-anchor-side notification unit that notifies the anchor radio base station 310A of the delay profile between the non-anchor radio base station 310B and the UE 10. Furthermore, the interface 315B constitutes a transmission unit that stops the process of transmitting the uplink signals before decoding when the interface 315B is notified of the stoppage of the process of transmitting the uplink signals before decoding, and continues the process of transmitting the uplink signals before decoding when the interface 315B is not notified of the stoppage of the process of transmitting the uplink signals before decoding.

The control unit 316B is configured to control the operation of the non-anchor radio base station 310B. For example, the control unit 316B instructs the interface 315B to transmit the uplink signal before decoding.

(Operation of Mobile Communication System)

Hereinafter, the operation of the mobile communication system according to the first embodiment will be described. FIG. 7 is a sequence diagram illustrating the operation of the mobile communication system 100 according to the first embodiment.

As illustrated in FIG. 7, in step 11, each non-anchor radio base station 310B notifies the anchor radio base station 310A of the delay profile between the non-anchor radio base station 310B and the UE 10.

In step 12, the anchor radio base station 310A determines a non-anchor radio base station 310B which is to stop a process of transmitting uplink signals before decoding through the backhaul network. Specifically, the anchor radio base station 310A determines the non-anchor radio base station 310B, for which the delay profile notified in the step 11 does not satisfy a predetermined condition, as the non-anchor radio base station 310B which is to stop the transmission of the uplink signals before decoding.

In step 13, the anchor radio base station 310A notifies the non-anchor radio base station 310B, for which the delay profile notified in the step 11 does not satisfy the predetermined condition, of stoppage of the process of transmitting the uplink signals before decoding through the backhaul network.

In step 14, the UE 10 transmits uplink signals to the anchor radio base station 310A and the non-anchor radio base stations 310B.

In step 15, a non-anchor radio base station 310B, which is not notified of the stoppage of the process of transmitting the uplink signal before decoding, transmits the uplink signal before decoding to the anchor radio base station 310A.

In step 16, the anchor radio base station 310A performs selective synthesis of the uplink signals before decoding, which are transmitted from the UE 10, and the uplink signals before decoding, which are received from the non-anchor radio base station 310B.

In step 17, the anchor radio base station 310A transmits a decoding result of the uplink signals to the MME 130.

Here, since the case, in which the anchor radio base station 310A is the MeNB 110A or the HeNB 110B, is exemplified, the decoding result of the uplink signals is transmitted to the MME 130. However, the embodiment is not limited thereto. In the case in which the anchor radio base station 310A is the MNB 210A or the HNB 210B, the decoding result of the uplink signals is transmitted to the RNC 220A.

Operation and Effect

In the first embodiment, the anchor radio base station 310A notifies a non-anchor radio base station 310B, notifying delay profiles which do not satisfy a predetermined condition, of stoppage of a process of transmitting uplink signals before decoding through the backhaul network. Consequently, unnecessary transmission of uplink signals before decoding to the anchor radio base station 310A from a non-anchor radio base station 310B, for which synchronization has not been sufficiently made, is suppressed, resulting in the suppression of an increase in the load of the backhaul network.

First Modification

Hereinafter, a first modification of the first embodiment will be explained. Mainly the differences from the first embodiment will be described, below.

In the first embodiment, delay profiles are notified by the non-anchor radio base stations 310B to the anchor radio base station 310A, and the anchor radio base station 310A determines a non-anchor radio base station 310B which is to stop a process of transmitting an uplink signal before decoding.

On the other hand, in the first modification, the anchor radio base station 310A (the interface 315A) notifies the non-anchor radio base station 310B of a delay profile between the anchor radio base station 310A and the UE 10. When the delay profile notified by the anchor radio base station 310A does not satisfy a predetermined condition, the non-anchor radio base station 310B (the interface 315B) stops a process of transmitting an uplink signal before decoding. When the delay profile notified by the anchor radio base station 310A satisfies the predetermined condition, the non-anchor radio base station 310B (the interface 315B) continues the process of transmitting the uplink signal before decoding.

Here, similarly to the first embodiment, the delay profile, for example, is transmission timing correction information (TA; Timing Advance) of the uplink signals transmitted from the UE 10 to the radio base station. The TA is measured by the radio base station based on the uplink signals transmitted from the UE 10.

Similarly to the first embodiment, the predetermined condition indicates that an amount (hereinafter, referred to as a shift amount), by which a delay profile (TA) between the UE 10 and the non-anchor radio base station 310B is shifted from a delay profile (TA) between the UE 10 and the anchor radio base station 310A, is within an allowable range. In other words, the predetermined condition indicates that a synchronization difference of the uplink signals is within the allowable range between the anchor radio base station 310A and the non-anchor radio base station 310B.

(Operation of Mobile Communication System)

Figure 8:
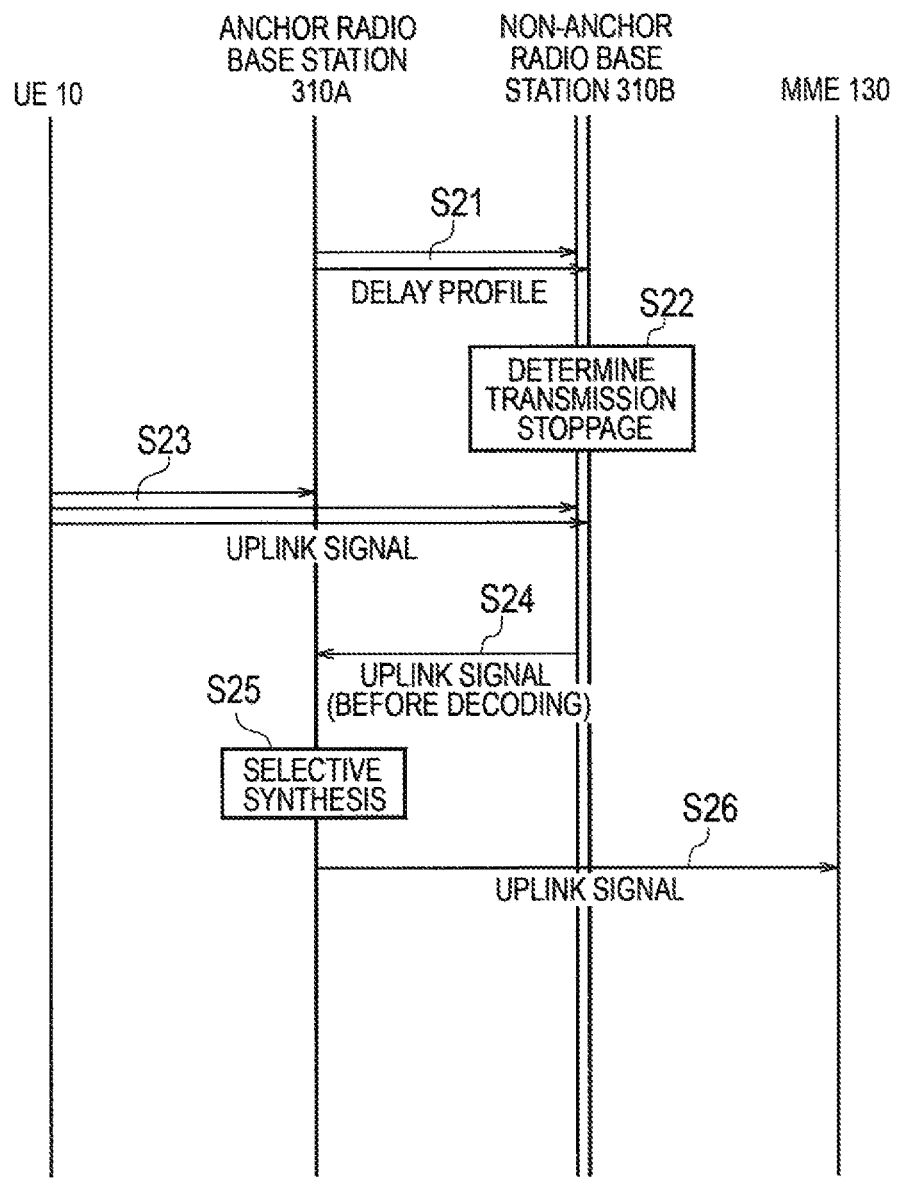
FIG. 8 is a sequence diagram illustrating the operation of the mobile communication system 100 according to the first modification.

Hereinafter, the operation of a mobile communication system according to the first modification will be described. FIG. 8 is a sequence diagram illustrating the operation of the mobile communication system 100 according to the first modification.

As illustrated in FIG. 8, in step 21, the anchor radio base station 310A notifies each non-anchor radio base station 310B of a delay profile between the anchor radio base station 310A and the UE 10.

In step 22, the non-anchor radio base station 310B determines whether to stop a process of transmitting an uplink signal before decoding through the backhaul network. Specifically, when the delay profile notified in the step 21 does not satisfy a predetermined condition, the non-anchor radio base station 310B determines to stop the process of transmitting the uplink signal before decoding.

In step 23, the UE 10 transmits uplink signals to the anchor radio base station 310A and the non-anchor radio base stations 310B.

In step 24, a non-anchor radio base station 310B, notified of the delay profile by the anchor radio base station 310A which satisfies the predetermined condition, transmits the uplink signal before decoding to the anchor radio base station 310A.

In step 25, the anchor radio base station 310A performs selective synthesis of the uplink signal before decoding, which are transmitted from the UE 10, and the uplink signals before decoding, which are received from the non-anchor radio base station 310B.

In step 26, the anchor radio base station 310A transmits a decoding result of the uplink signals to the MME 130.

Here, since the case, in which the anchor radio base station 310A is the MeNB 110A or the HeNB 110B, is exemplified, the decoding result of the uplink signals is transmitted to the MME 130. However, the embodiment is not limited thereto. In the case in which the anchor radio base station 310A is the MNB 210A or the HNB 210B, the decoding result of the uplink signals is transmitted to the RNC 220A.

Operation and Effect

In the first modification, when the delay profile notified by the anchor radio base station 310A does not satisfy the predetermined condition, the non-anchor radio base station 310B stops the process of transmitting the uplink signal before decoding. Consequently, unnecessary transmission of uplink signals before decoding to the anchor radio base station 310A from a non-anchor radio base station 310B, for which synchronization has not been sufficiently made, is suppressed, resulting in the suppression of an increase in the load of the backhaul network.

Other Embodiments

The present invention has been described according to the embodiments described above. However, it should not be understood that the discussions and drawings constituting a part of this disclosure limit the present invention. From this disclosure, various alternative embodiments, examples and operational techniques will be apparent to those skilled in the art.

Particularly not mentioned in the embodiment, it is noted that the uplink signal before decoding transmitted from the non-anchor radio base station 310B to the anchor radio base station 310A includes a result (a bit sequence) obtained by sampling I/Q components constituting uplink signals received in the non-anchor radio base station 310B.

It is preferable that the uplink signal before decoding is transmitted from the non-anchor radio base station 310B to the anchor radio base station 310A in each subframe. It is preferable that the uplink signal before decoding includes a subframe number, and an identifier for identifying the UE 10, in addition to the result (the bit sequence) obtained by sampling the I/Q components. Alternatively, it is preferable that the uplink signal before decoding includes, besides these pieces of information, the type of a scheme (for example, a legacy scheme, a carrier aggregation scheme) in which the UE 10 transmits the uplink signal.

In the embodiment, as an example of the delay profile, TA (Timing Advance) was exemplified. However, the embodiment is not limited thereto. It is sufficient if the delay profile is information for designating synchronization shift of the non-anchor radio base station 310B from the anchor radio base station 310A with respect to uplink signals transmitted from the UE 10.

It is noted that the entire content of U.S. Provisional Application No. 61/612,559 (filed on Mar. 19, 2012) is incorporated in the present specification by reference.

INDUSTRIAL APPLICABILITY

As described above, the mobile communication system and the mobile communication method in the present invention are beneficial for a mobile communication field because unnecessary transmission of uplink signals before decoding to the anchor radio base station from a non-anchor radio base station, for which synchronization has not been sufficiently made, is suppressed, resulting in the suppression of an increase in the load of the backhaul network.

What is claimed is:

1. A mobile communication system, in which a plurality of radio base stations receive, in cooperation with one another, uplink signals transmitted from a radio terminal, wherein
the plurality of radio base stations comprise: an anchor radio base station; and a non-anchor radio base station other than the anchor radio base station,
the non-anchor radio base station comprises:
a non-anchor-side interface configured to notify the anchor radio base station of a delay profile between the non-anchor radio base station and the radio terminal,
the anchor radio base station comprises:
an anchor-side interface configured to notify a non-anchor radio base station, notifying the delay profile which does not satisfy a predetermined condition, of stoppage of a process of transmitting an uplink signal before decoding through a backhaul network; and
a controller configured to perform selective synthesis of the uplink signal before decoding, which is received from the non-anchor radio base station, and an uplink signal before decoding, which is received from the radio terminal, and
the non-anchor radio base station comprises:
a transmitter configured to stop the process of transmitting the uplink signal before decoding when the non-anchor radio base station is notified of the stoppage of the process of transmitting the uplink signal before decoding, and continue the process of transmitting the uplink signal before decoding when the non-anchor radio base station is not notified of the stoppage of the process of transmitting the uplink signal before decoding.

2. A mobile communication system, in which a plurality of radio base stations receive, in cooperation with one another, uplink signals transmitted from a radio terminal, wherein
the plurality of radio base stations comprise: an anchor radio base station; and a non-anchor radio base station other than the anchor radio base station,
the anchor radio base station comprises:
an anchor-side interface configured to notify the non-anchor radio base station of a delay profile between the anchor radio base station and the radio terminal; and
a controller configured to perform selective synthesis of an uplink signal before decoding, which is received from the non-anchor radio base station through a backhaul network, and an uplink signal before decoding, which is received from the radio terminal, and
the non-anchor radio base station comprises:
a transmitter configured to stop a process of transmitting the uplink signal before decoding when the delay profile notified by the anchor radio base station does not satisfy a predetermined condition, and continue the process of transmitting the uplink signal before decoding when the delay profile notified by the anchor radio base station satisfies the predetermined condition.

3. A mobile communication method, in which a plurality of radio base stations receive, in cooperation with one another, uplink signals transmitted from a radio terminal, wherein
the plurality of radio base stations comprise: one anchor radio base station; and a non-anchor radio base station other than the anchor radio base station, comprising the steps of:
notifying, by the non-anchor radio base station, the anchor radio base station of a delay profile between the non-anchor radio base station and the radio terminal;
notifying, by the anchor radio base station, a non-anchor radio base station that notifies the delay profile which does not satisfy a predetermined condition, of stoppage of a process of transmitting an uplink signal before decoding through a backhaul network;
stopping, by a non-anchor radio base station notified of the stoppage of the process of transmitting the uplink signal before decoding, the process of transmitting the uplink signal before decoding;
continuing, by a non-anchor radio base station not notified of the stoppage of the process of transmitting the uplink signal before decoding, the process of transmitting the uplink signal before decoding; and
performing, by the anchor radio base station, selective synthesis of the uplink signal before decoding, which is received from the non-anchor radio base station, and an uplink signal before decoding, which is received from the radio terminal.

4. A mobile communication method, in which a plurality of radio base stations receive, in cooperation with one another, uplink signals transmitted from a radio terminal, wherein
the plurality of radio base stations comprise: one anchor radio base station; and a non-anchor radio base station other than the anchor radio base station, comprising the steps of:
notifying, by the anchor radio base station, the non-anchor radio base station of a delay profile between the anchor radio base station and the radio terminal;
stopping, by the non-anchor radio base station, a process of transmitting an uplink signal before decoding through a backhaul network when the delay profile notified by the anchor radio base station dose not satisfy a predetermined condition;
continuing, by the non-anchor radio base station, the process of transmitting the uplink signal before decoding when the delay profile notified by the anchor radio base station satisfies the predetermined condition; and
performing, by the anchor radio base station, selective synthesis of the uplink signal before decoding, which is received from the non-anchor radio base station, and an uplink signal before decoding, which is received from the radio terminal.

* * * * *